United States Patent
Arugonda et al.

(10) Patent No.: US 9,344,877 B1
(45) Date of Patent: May 17, 2016

(54) SYMMETRIC EQUIVALENT PUBLIC LAND MOBILE NETWORK (EPLMN) CONFIGURATIONS AMONG SUBSCRIPTIONS

(71) Applicant: QUALCOMM Incorporated, San Diego, CA (US)

(72) Inventors: Sandeep Arugonda, Irvine, CA (US); Uttam Pattanayak, San Diego, CA (US); Andrzej Yurkevich, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/794,414

(22) Filed: Jul. 8, 2015

(51) Int. Cl.
*H04W 60/04* (2009.01)
*H04W 8/20* (2009.01)
*H04W 8/02* (2009.01)
*H04W 60/00* (2009.01)
H04W 84/04 (2009.01)

(52) U.S. Cl.
CPC *H04W 8/20* (2013.01); *H04W 8/02* (2013.01); *H04W 60/00* (2013.01); *H04W 84/042* (2013.01)

(58) Field of Classification Search
CPC ............ H04W 72/0426; H04W 72/1215; H04W 60/00; H04W 4/021; H04W 4/028; H04W 36/14; H04W 76/027; H04W 48/18; H04W 8/005; H04W 4/08; H04W 52/0225; H04W 8/205; H04L 5/14

USPC ........ 455/411, 414.1, 433, 432.1, 421, 435.1, 455/456.1, 457, 181.1; 370/503, 466, 217, 370/330; 709/218, 230
See application file for complete search history.

(56) References Cited

U.S. PATENT DOCUMENTS

| | | | |
|---|---|---|---|
| 7,693,506 B1 * | 4/2010 | Back | H04W 60/00 455/432.1 |
| 8,554,167 B2 | 10/2013 | Geary et al. | |
| 8,611,280 B2 | 12/2013 | Morera et al. | |
| 9,026,132 B2 * | 5/2015 | Wijayanathan | H04W 4/021 455/181.1 |
| 2007/0202875 A1 | 8/2007 | Dorsey et al. | |
| 2015/0065132 A1 | 3/2015 | Ramkumar et al. | |

FOREIGN PATENT DOCUMENTS

WO     2013027183 A1     2/2013

* cited by examiner

*Primary Examiner* — Phuoc H Doan
(74) *Attorney, Agent, or Firm* — The Marbury Law Group, PLLC

(57) ABSTRACT

Various embodiments include methods implemented on a mobile communication device for acquiring service when the mobile communication device has a first subscription and a second subscription that belong to the same network operator. The methods may include receiving a first equivalent public land mobile network (EPLMN) database associated with the first subscription, determining whether a second EPLMN database associated with the second subscription is the same as the first EPLMN database, and modifying the second EPLMN database based on the first EPLMN database in response to determining that the second EPLMN database associated with the second subscription is not the same as the first EPLMN database.

30 Claims, 8 Drawing Sheets

SYMMETRIC EQUIVALENT PUBLIC LAND MOBILE NETWORK (EPLMN) CONFIGURATIONS AMONG SUBSCRIPTIONS

BACKGROUND

Some designs of mobile communication devices—such as smart phones, tablet computers, and laptop computers—contain one or more Subscriber Identity Module (SIM) cards that provide users with access to multiple separate mobile telephony networks. Examples of mobile telephony networks include Third Generation (3G), Fourth Generation (4G), Long Term Evolution (LTE), Time Division Multiple Access (TDMA), Code Division Multiple Access (CDMA), Wideband CDMA (WCDMA), Global System for Mobile Communications (GSM), and Universal Mobile Telecommunications Systems (UMTS). A public land mobile network (PLMN) is a mobile telephony network controlled by a specific network operator. A PLMN may be defined by a unique combination of a mobile country code and a mobile network code that is assigned to the network operator. Each SIM on the mobile communication device may support a subscription that is used to register with and communicate over a PLMN using a corresponding radio access technology (RAT). For example, a subscription may use a LTE RAT to communicate with a PLMN that supports LTE communication.

A network operator may operate more than one PLMN. Some of the PLMNs that belong to the same network operator may be considered to be equivalent such that a subscription belonging to the network operator may register with any of the equivalent PLMNs to communicate. For example, a network operator may operate a PLMN for GSM communication and another equivalent PLMN for UMTS communication. A subscription on a mobile communication device that belongs to the network operator and is capable of both UMTS and GSM communication may be able to register with either the UMTS or GSM PLMN to acquire network service.

A subscription on the mobile communication device may store an equivalent PLMN (EPLMN) database that lists the PLMNs considered to be equivalent by the network operator. The network operator may send the EPLMN database to a subscription on the mobile communication device through one of the PLMNs in the EPLMN database on which the subscription is registered. The EPLMN database may be stored and associated with the subscription. When the subscription attempts to acquire service from a network, the subscription may check the EPLMN database to determine all of the equivalent PLMNs that are available to the subscription. The subscription may select one of the PLMNs and register with the selected PLMN. The selection may depend on the RAT capabilities of the subscription compared with the EPLMNs available. For example, if a subscription is capable of GSM and UMTS communication, the subscription may select an EPLMN with UMTS capabilities because UMTS has a higher data communication rate than GSM.

A mobile communication device may have more than one SIM that supports more than one subscription. More than one subscription may belong to the same network operator, in which case the same EPLMNs should be available to each subscription. In other words, the EPLMN database for each subscription should be the same. However, in some cases the network operator may not send the EPLMN database to a subscription. In such cases, a user may switch from a first subscription that has the EPLMN database to a second subscription that does not have the EPLMN database. The first subscription does not advertise the EPLMN database to other subscriptions in the mobile communication device. This leads to an asymmetric EPLMN configuration because the second subscription may not be informed of all the PLMNs that are available. Thus, the second subscription may end up registering with a lower data communication rate PLMN (e.g., GSM) even through a higher data communication rate PLMN is available (e.g., UMTS).

SUMMARY

Various embodiments include methods implemented on a mobile communication device for acquiring service when the mobile communication device has a first subscription and a second subscription that belong to the same network operator. Various embodiment methods may include receiving a first equivalent public land mobile network (EPLMN) database associated with the first subscription, determining whether a second EPLMN database associated with the second subscription is the same as the first EPLMN database, and modifying the second EPLMN database based on the first EPLMN database in response to determining that the second EPLMN database associated with the second subscription is not the same as the first EPLMN database.

Some embodiments may further include registering the second subscription with a public land mobile network (PLMN) selected from the second EPLMN database, which may be performed in response to determining that the second EPLMN database associated with the second subscription is the same as the first EPLMN database. In some embodiments, registering the second subscription with a PLMN selected from the second EPLMN database may include selecting a PLMN, from the second EPLMN database, associated with a radio access technology (RAT) with a higher data communication rate than radio access technologies associated with the other PLMNs in the second EPLMN database. In some embodiments, the method may further include receiving the second EPLMN database associated with the second subscription.

In some embodiments, modifying the second EPLMN database based on the first EPLMN database may include appending non-duplicative entries from the first EPLMN database to the second EPLMN database. In some embodiments, the second EPLMN database may be empty and modifying the second EPLMN database based on the first EPLMN database may include copying the first EPLMN database to the second EPLMN database.

In some embodiments, in a case in which the first subscription is registered on a first PLMN through a first RAT and the second subscription is registered on a second PLMN, the embodiment methods may further include determining whether the second subscription is capable of registering with the second PLMN through the first RAT, and registering the second subscription with the second PLMN through the first RAT in response to determining that the second subscription is capable of registering with the second PLMN through the first RAT. In some embodiments, determining whether a second EPLMN database associated with the second subscription is the same as the first EPLMN database may include determining whether the second EPLMN database stores the same number of PLMNs as the first EPLMN database, and determining whether each PLMN stored in the second EPLMN database matches a PLMN stored in the first EPLMN database.

Further embodiments include a mobile communication device including a processor configured with processor-executable instructions to perform operations of the embodiment methods described above. Further embodiments include a non-transitory processor-readable storage medium having stored thereon processor-executable software instructions configured to cause a processor to perform operations of the embodiment methods described above. Further embodiments include a mobile communication device that includes means for performing functions of the operations of the embodiment methods described above.

BRIEF DESCRIPTION OF THE DRAWINGS

The accompanying drawings, which are incorporated herein and constitute part of this specification, illustrate exemplary embodiments, and together with the general description and the detailed description given herein, serve to explain the features of the disclosed systems and methods.

DETAILED DESCRIPTION

Figure 1:
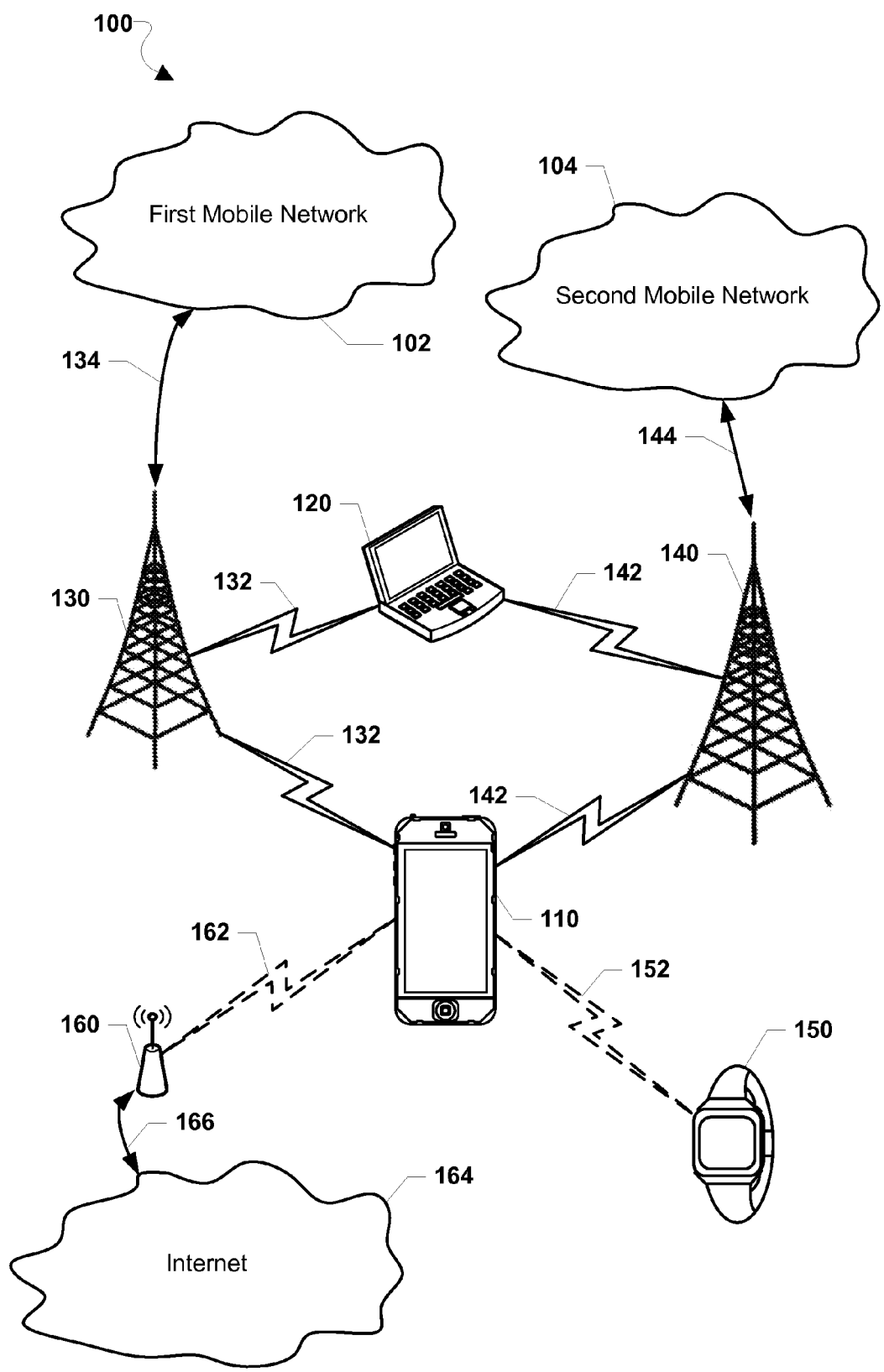
FIG. 1 is a communication system block diagram of mobile telephony networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the written description or the claims.

As used herein, the term "mobile communication device," "multi-SIM mobile communication device," or "multi-SIM device" refers to any one or all of cellular telephones, smart phones, personal or mobile multi-media players, personal data assistants, laptop computers, tablet computers, smart books, palm-top computers, wireless electronic mail receivers, multimedia Internet-enabled cellular telephones, wireless gaming controllers, and similar personal electronic devices that includes one or more SIM cards, a programmable processor, memory, and circuitry for connecting to at least two mobile communication network with one or more shared RF resources. Various embodiments may be useful in mobile communication devices, such as smart phones, and so such devices are referred to in the descriptions of various embodiments. However, the embodiments may be useful in any electronic devices that may individually maintain a plurality of subscriptions that utilize at least one shared RF chain, which may include one or more of antennae, radios, transceivers, etc.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a mobile communication device on a network and enable a communication service with the network. Because the information stored in a SIM enables the mobile communication device to establish a communication link for a particular communication service with a particular network, the term "subscription" is used herein as a shorthand reference to refer to the communication service associated with and enabled by the information stored in a particular SIM as the SIM and the communication network, as well as the services and subscriptions supported by that network, correlate to one another.

In the following descriptions of various embodiments, references are made to a first subscription and a second subscription, a first RAT and a second RAT, a first PLMN and a second PLMN, and a first EPLMN database and a second EPLMN database. The references to the first and second subscriptions, first and second RATs, first and second PLMNs, and first and second EPLMN databases are arbitrary and are used merely for the purposes of describing the embodiments. The device processor may assign any indicator, name or other designation to differentiate the subscriptions associated with one or more SIMs to differentiate the RATs used by a subscription, to differentiate between PLMNs, and/or to differentiate EPLMN databases stored on the mobile communication device.

In the following descriptions of various embodiments, references are made to specific RATs associated with specific subscriptions or with specific PLMNs, such UMTS RATs, UMTS PLMNs, GSM RATs, and GSM PLMNs. The references to UMTS and GSM are arbitrary and used merely for the purposes of describing the embodiments. Subscriptions and PLMNs in various embodiments may utilize a variety of RATs to communicate with a mobile telephony network, including but not limited to 3G, 4G, LTE, TDMA, CDMA, WCDMA, GSM, and UMTS.

A multi-SIM mobile communication device may support multiple subscriptions that belong to the same network operator. The network operator may control a number of different PLMNs through which the subscriptions may communicate. Some of these PLMNs may be considered equivalent so that a subscription may register with any of the equivalent PLMNs. Each subscription may store an associated EPLMN database, in which each PLMN in the EPLMN database is considered equivalent to the other PLMNs in the database. The EPLMN database may be provided by the network operator to each subscription.

In some cases, one subscription of the mobile communication device may have obtained the EPLMN database from the network operator but another subscription of the mobile communication device belonging to the same network operator may not have obtained the EPLMN database or may have an incomplete EPLMN database. Subscriptions do not normally advertise or otherwise make the EPLMN database available to other subscriptions, which may result in asymmetric EPLMN configurations in the mobile communication device. A subscription that has no EPLMN database or has an incomplete EPLMN database may not be informed of other equivalent PLMNs that are available. For example, a first subscription of the mobile communication device may store an EPLMN database with entries for a GSM PLMN and a UMTS PLMN. A second subscription of the mobile communication device, which belongs to the same network operator, may not store the EPLMN database. The second subscription may usually register with the GSM PLMN even though the second subscription is capable of UMTS communication. Because the second subscription does not have the EPLMN database, the second subscription may not attempt to connect with the equivalent UMTS PLMN unless the second subscription loses service with the GSM PLMN. This results in the second subscription staying on a lower data communication rate connection even though a higher data communication rate connection is available.

In overview, various embodiments provide systems and methods implemented with a processor of a mobile communication device (e.g., a multi-SIM mobile communication device) for acquiring service on a subscription by sharing and appending EPLMN databases from other subscriptions that belong to the same network operator. In various embodiments, a mobile communication device may have one or more SIMs that support at least a first subscription and a second subscription. The first subscription and the second subscription may belong to the same network operator. The first subscription may be currently active and registered on a first PLMN through a first RAT (e.g., UMTS or LTE). The second subscription may be idle and registered on a second PLMN through a second RAT (e.g., GSM).

In various embodiments, the first subscription of the mobile communication device may receive an EPLMN database from the network operator. The EPLMN database may contain a number of equivalent PLMNs that are operated by the network operator, including the first PLMN and the second PLMN. The processor of the mobile communication device may switch from the first subscription to the second subscription. For example, the processor may receive an input from a user of the mobile communication device to switch from the first subscription to the second subscription.

In some embodiments, the processor may optionally determine whether the second subscription may register with the second PLMN using the same RAT that the first subscription used to communicate with the first PLMN. This may be done in instances in which the first subscription is communicating over a high data communication rate RAT and the second subscription is able to maintain continuity and communicate over the same RAT. For example, the first subscription may be communicating with the first PLMN using a UMTS RAT. The second subscription may be able to communicate with the second PLMN over either a GSM or UMTS RAT. Accordingly, the processor may cause the second subscription to register with the second PLMN using the UMTS RAT.

In various embodiments, the processor may determine whether the second subscription of the mobile communication device has an associated EPLMN database that is the same as the EPLMN database associated with the first subscription. The processor may compare the EPLMN database associated with the first subscription (which was received from the network operator) to the EPLMN database associated with the second subscription to determine whether the EPLMN database associated with the second subscription was also received from the network operator. For example, the network operator may not have sent the EPLMN database to the second subscription, in which case the EPLMN database of the second subscription may be empty. Because the first subscription and the second subscription belong to the same network operator, the EPLMN databases for both subscriptions should contain the same entries. When the EPLMN databases are not the same for both subscriptions, the processor may determine that the second subscription did not receive the EPLMN database from the network operator or that the EPLMN database associated with the second subscription is incomplete. In such cases, the second subscription may not check for all available equivalent PLMNs during PLMN selection. This results in an asymmetric configuration of EPLMNs in the mobile communication device.

If the processor determines that that the EPLMN database associated with the second subscription is not the same as the EPLMN database associated with the first subscription (e.g. the second subscription did not receive the EPLMN database from the network operator), the processor may append the EPLMN database associated with the first subscription to the EPLMN database associated with the second subscription (or otherwise modify the EPLMN database associated with the second subscription based on the EPLMN database associated with the first subscription). This may include (but is not limited to) copying the whole EPLMN database associated with the first subscription to the EPLMN database associated with second subscription, or adding non-duplicative PLMNs from the EPLMN database associated with the first subscription to the EPLMN database associated with the second subscription. The processor may also modify the EPLMN database associated with the first subscription based on the EPLMN database associated with the second subscription if the first subscription is missing some PLMN entries.

The processor may register the second subscription with a PLMN selected from the EPLMN database of the second subscription. The processor may select a PLMN from the EPLMN database associated with the second subscription capable of communicating on a RAT with a higher data communication rate than other PLMNs in the EPLMN database. This allows the second subscription to communicate on the highest data communication rate network available. Alternatively, the processor may select a PLMN from the EPLMN database that may communicate through the same RAT as the first subscription.

If the processor determines that the EPLMN database associated with the second subscription is the same as the EPLMN database associated with the first subscription (e.g., the second subscription did receive the EPLMN database from the network operator), the processor may register the second subscription with a PLMN selected from the EPLMN database associated with the second subscription without the need to refer to the EPLMN database associated with the first subscription. In this manner, a mobile communication device may maintain a symmetric EPLMN configuration for subscriptions that belong to the same network operator.

Various embodiments may be implemented within a variety of communication systems 100, such as at least two mobile telephony networks, an example of which is illustrated in FIG. 1. A first mobile network 102 and a second mobile network 104 typically each include a plurality of cellular base stations (e.g., a first base station 130 and a second base station 140). A first mobile communication device 110 may be in communication with the first mobile network 102 through a cellular connection 132 to the first base station 130. The first mobile communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second mobile communication device 120 may similarly communicate with the first mobile network 102 through the cellular connection 132 to the first base station 130. The second mobile communication device 120 may also communicate with the second mobile network 104 through the cellular connection 142 to the second base station 140. The cellular connections 132 and 142 may be made through two-way wireless communication links, such as Third Generation (3G), Fourth Generation (4G), Long Term Evolution (LTE), Time Division Multiple Access (TDMA), Code Division Multiple Access (CDMA), Wideband CDMA (WCDMA), Global System for Mobile Communications (GSM), Universal Mobile Telecommunications Systems (UMTS), and other mobile telephony communication technologies.

While the mobile communication devices 110, 120 are shown connected to the first mobile network 102 and, optionally, to the second mobile network 104, in some embodiments (not shown), the mobile communication devices 110, 120 may include two or more subscriptions to two or more mobile networks and may connect to those subscriptions in a manner similar to those described herein.

In some embodiments, the first mobile communication device 110 may optionally establish a wireless connection 152 with a peripheral device 150 used in connection with the first mobile communication device 110. For example, the first mobile communication device 110 may communicate over a Bluetooth® link with a Bluetooth-enabled personal computing device (e.g., a "smart watch"). In some embodiments, the first mobile communication device 110 may optionally establish a wireless connection 162 with a wireless access point 160, such as over a Wi-Fi connection. The wireless access point 160 may be configured to connect to the Internet 164 or another network over a wired connection 166.

While not illustrated, the second mobile communication device 120 may similarly be configured to connect with the peripheral device 150 and/or the wireless access point 160 over wireless links.

Figure 2:
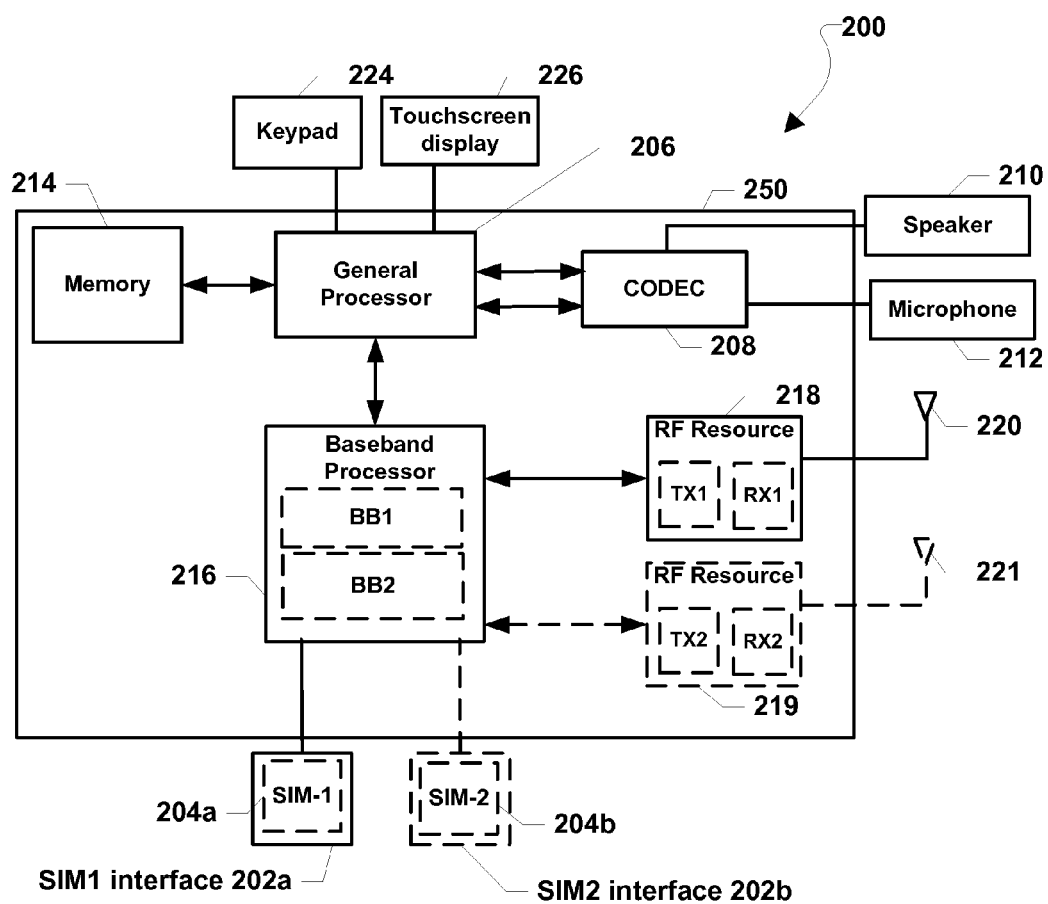
FIG. 2 is a component block diagram of a multi-SIM mobile communication device according to various embodiments.

FIG. 2 is a functional block diagram of a multi-SIM mobile communication device 200 suitable for implementing various embodiments. With reference to FIGS. 1-2, the multi-SIM mobile communication device 200 may be similar to one or more of the mobile communication devices 110, 120 as described. The multi-SIM mobile communication device 200 may include a first SIM interface 202a, which may receive a first identity module SIM-1 204a that is associated with a first subscription. The multi-SIM mobile communication device 200 may also optionally include a second SIM interface 202b, which may receive an optional second identity module SIM-2 204b that is associated with a second subscription.

A SIM in various embodiments may be a Universal Integrated Circuit Card (UICC) that is configured with SIM and/or Universal SIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a central processing unit (CPU), read only memory (ROM), random access memory (RAM), electrically erasable programmable read only memory (EEPROM) and input/out (I/O) circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home Public Land Mobile Number (HPLMN) code, etc.) to indicate the SIM card network operator provider. An Integrated Circuit Card Identity (ICCID) SIM serial number may be printed on the SIM card for identification. However, a SIM may be implemented within a portion of memory of the multi-SIM mobile communication device 200 (e.g., in a memory 214), and thus need not be a separate or removable circuit, chip or card.

The multi-SIM mobile communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer-readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data and may store EPLMN databases for subscriptions operating on the multi-SIM mobile communication device 200.

The general processor 206 and the memory 214 may each be coupled to at least one baseband modem processor 216. Each SIM and/or RAT in the multi-SIM mobile communication device 200 (e.g., the SIM-1 204a and/or the SIM-2 204b) may be associated with a baseband-RF resource chain. A baseband-RF resource chain may include the baseband modem processor 216, which may perform baseband/modem functions for communications with/controlling a RAT, and may include one or more amplifiers and radios, referred to generally herein as RF resources (e.g., RF resource 218, 219). In some embodiments, baseband-RF resource chains may share the baseband modem processor 216 (i.e., a single device that performs baseband/modem functions for all RATs on the multi-SIM mobile communication device 200). In other embodiments, each baseband-RF resource chain may include physically or logically separate baseband processors (e.g., BB1, BB2).

The RF resource 218 may be a transceiver that performs transmit/receive functions for each of the SIMs/RATs on the multi-SIM mobile communication device 200. The RF resource 218 may include separate transmit and receive circuitry, or may include a transceiver that combines transmitter and receiver functions. In some embodiments, the RF resource 218 may include multiple receive circuitries. The RF resource 218 may be coupled to a wireless antenna (e.g., a wireless antenna 220). The RF resource 218 may also be coupled to the baseband modem processor 216. In some optional embodiments, the multi-SIM mobile communication device 200 may include an optional RF resource 219 configured similarly to the RF resource 218 and coupled to an optional wireless antenna 221.

In some embodiments, the general processor 206, the memory 214, the baseband processor(s) 216, and the RF resources 218, 219 may be included in the multi-SIM mobile communication device 200 as a system-on-chip 250. In some embodiments, the first and second SIMs 204a, 204b and the corresponding interfaces 202a, 202b to each subscription may be external to the system-on-chip 250. Further, various input and output devices may be coupled to components on the system-on-chip 250, such as interfaces or controllers. Example user input components suitable for use in the multi-SIM mobile communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive selection of a contact from a contact list or receive a telephone number. As another example, the request to initiate the outgoing call may be in the form of a voice command received via the microphone 212. Interfaces may be provided between the various software modules and functions in the multi-SIM mobile communication device 200 to enable communication between them, as is known in the art.

Functioning together, the two SIMs 204a, 204b, the baseband processor BB1, BB2, the RF resources 218, 219, and the wireless antennas 220, 221 may constitute two or more radio access technologies (RATs). For example, the multi-SIM mobile communication device 200 may be a LTE communication device that includes a SIM, baseband processor, and RF resource configured to support two different RATs, such as LTE, WCDMA, and GSM. More RATs may be supported on the multi-SIM mobile communication device 200 by adding more SIM cards, SIM interfaces, RF resources, and antennae for connecting to additional mobile networks.

In some embodiments (not shown), the multi-SIM mobile communication device 200 may include, among other things, additional SIM cards, SIM interfaces, a plurality of RF resources associated with the additional SIM cards, and additional antennae for supporting subscriptions communications with additional mobile networks.

Figure 3A:
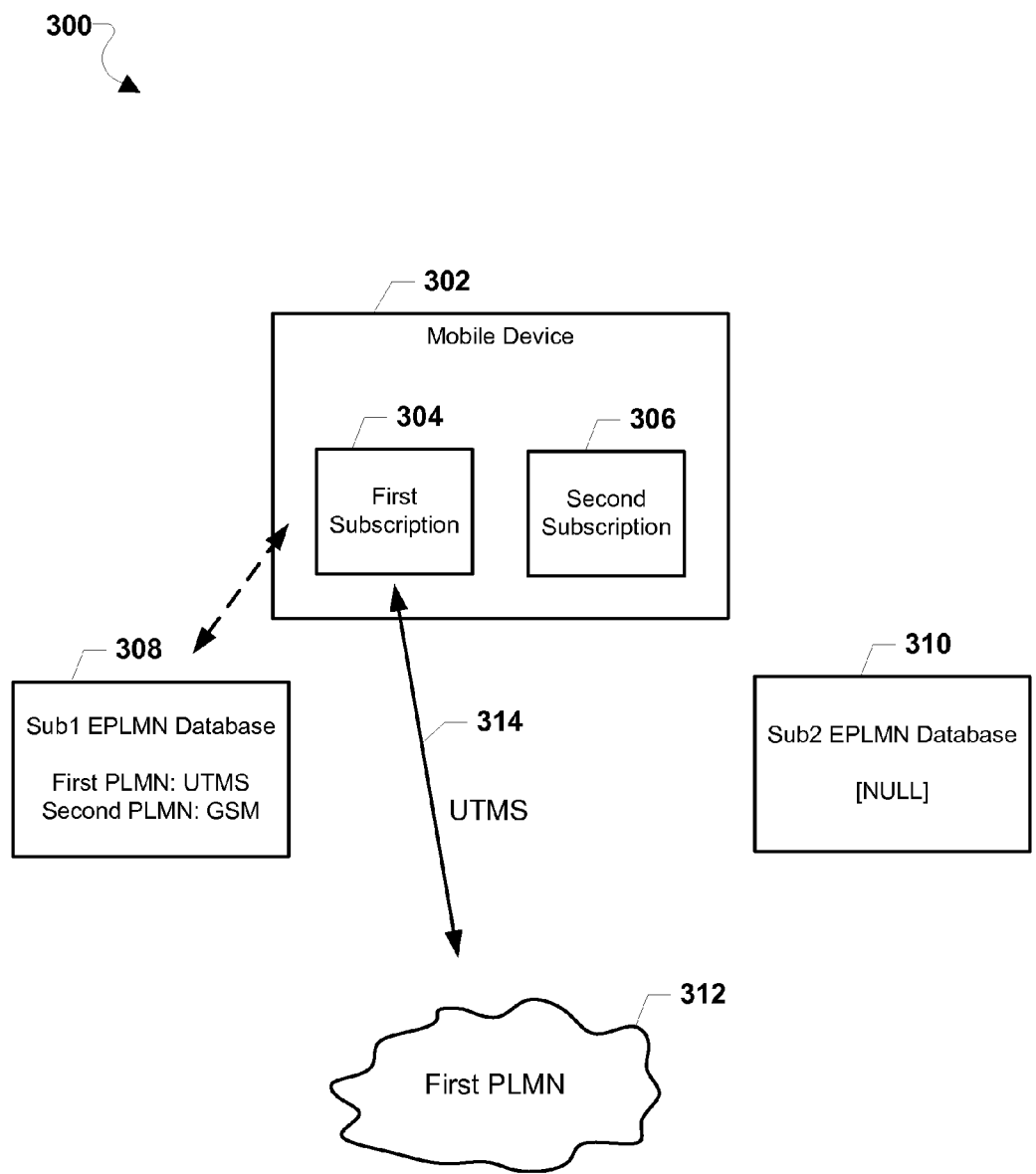
FIGS. 3A-3B are block diagrams illustrating conventional PLMN registration in a mobile communication device.
Figure 3B:
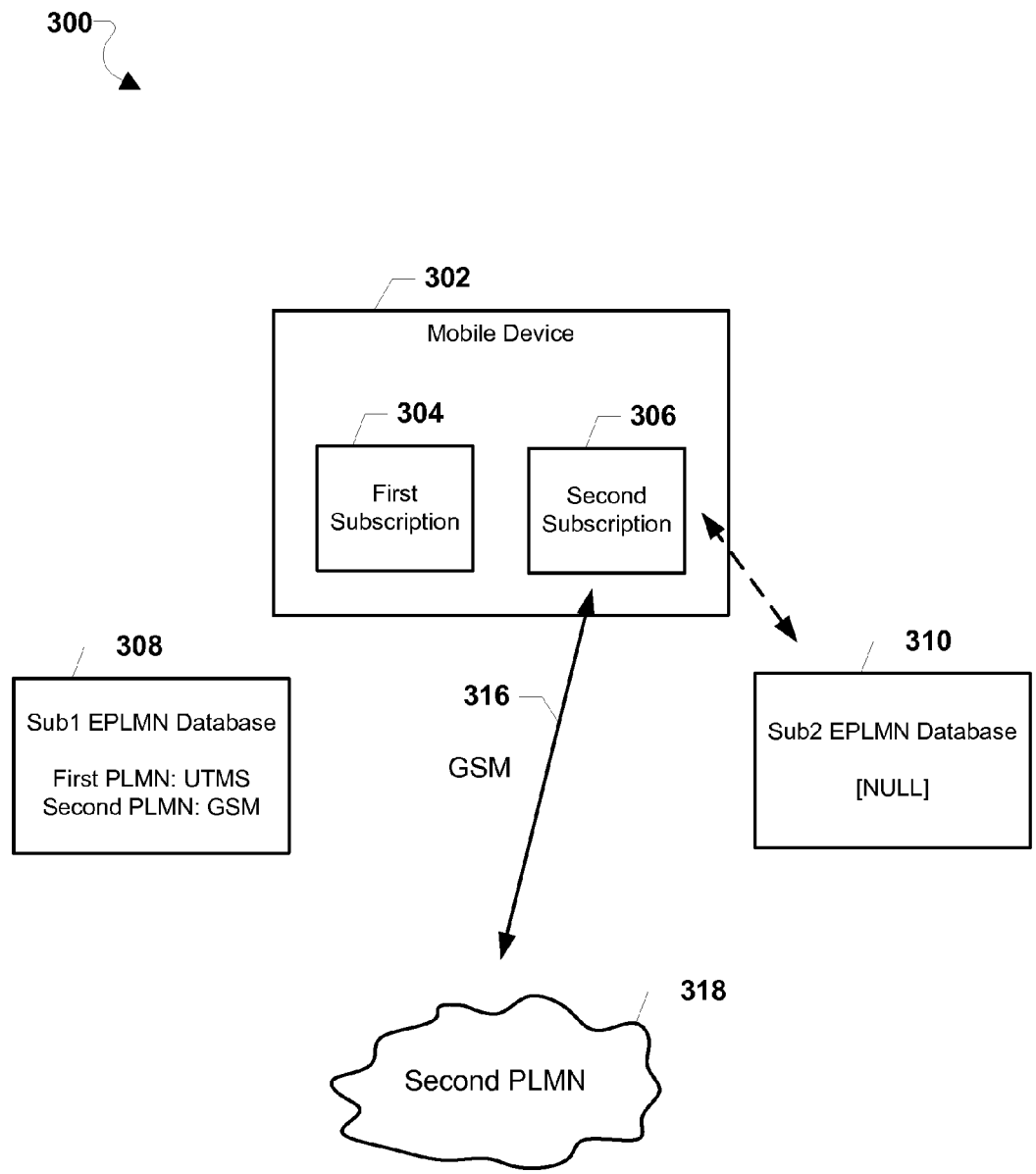

Block diagram 300 in FIGS. 3A-3B illustrates conventional PLMN selection and registration in a mobile communication device. The block diagram 300 includes a mobile communication device 302 with one or more SIMs that supports a first subscription 304 and a second subscription 306. The first subscription 304 and the second subscription 306 may belong to the same network operator. The first subscription 304 may normally be registered with a first PLMN 312 through a UMTS RAT 314. The first subscription 304 may be associated with an EPLMN database 308. The EPLMN database 308 stores or otherwise contains equivalent PLMNs to the first PLMN 312. For example, the EPLMN database 308 shows that the first PLMN 312 is equivalent to a second PLMN 318 that operates through a GSM RAT 316. The EPLMN database 308 may be sent by the network operator to the mobile communication device 302 to be stored and associated with the first subscription 304 such that the first subscription 304 may use the EPLMN database 308 to acquire service from PLMNs that are equivalent to the first PLMN 312.

The second subscription 306 may be associated with another EPLMN database 310. The EPLMN database 310 may be empty, or null, in contrast to the EPLMN database 308, which is populated. This may be because the network operator did not send any information regarding equivalent PLMNs to the second subscription 306. Because the first subscription 304 and the second subscription 306 belong to the same network operator, the EPLMN databases 308, 310 should be the same. The first subscription 304 does not advertise or share the EPLMN database 308 with other subscriptions, even if those subscriptions belong to the same network operator. Thus the differences in the EPLMN databases 308, 310 give rise to an asymmetric EPLMN configuration in the mobile communication device 302, which may make PLMN selection by the mobile communication device 302 less efficient.

FIG. 3B shows an example of PLMN selection in the mobile communication device 302 when an asymmetric EPLMN configuration exists. With reference to FIGS. 3A-3B, a user may initiate a switch from the first subscription 304 to the second subscription 306. The second subscription 306 may normally register with the second PLMN 318 through the GSM RAT 316. When the second subscription 306 becomes active, the second subscription 306 performs a PLMN selection procedure. During the PLMN selection procedure, the second subscription 306 may check the EPLMN database 310 to determine all the equivalent PLMNs that are available. The second PLMN 318 and the first PLMN 312 are equivalent, but the EPLMN database 310 is empty and so the second subscription 306 is not informed of this equivalency. The second subscription 306 may instead register with the second PLMN 318 by default using the GSM RAT 316. The second subscription 306 may also be capable of communicating through the UMTS RAT 314, and thus may utilize the first PLMN 312. However, because the EPLMN database 310 has no entries, the second subscription 306 remains on the lower data communication rate GSM RAT 316. The second subscription 306 may only register with the first PLMN 312 after the second subscription 306 loses service with the second PLMN 318 and performs a full network search.

Figure 4A:
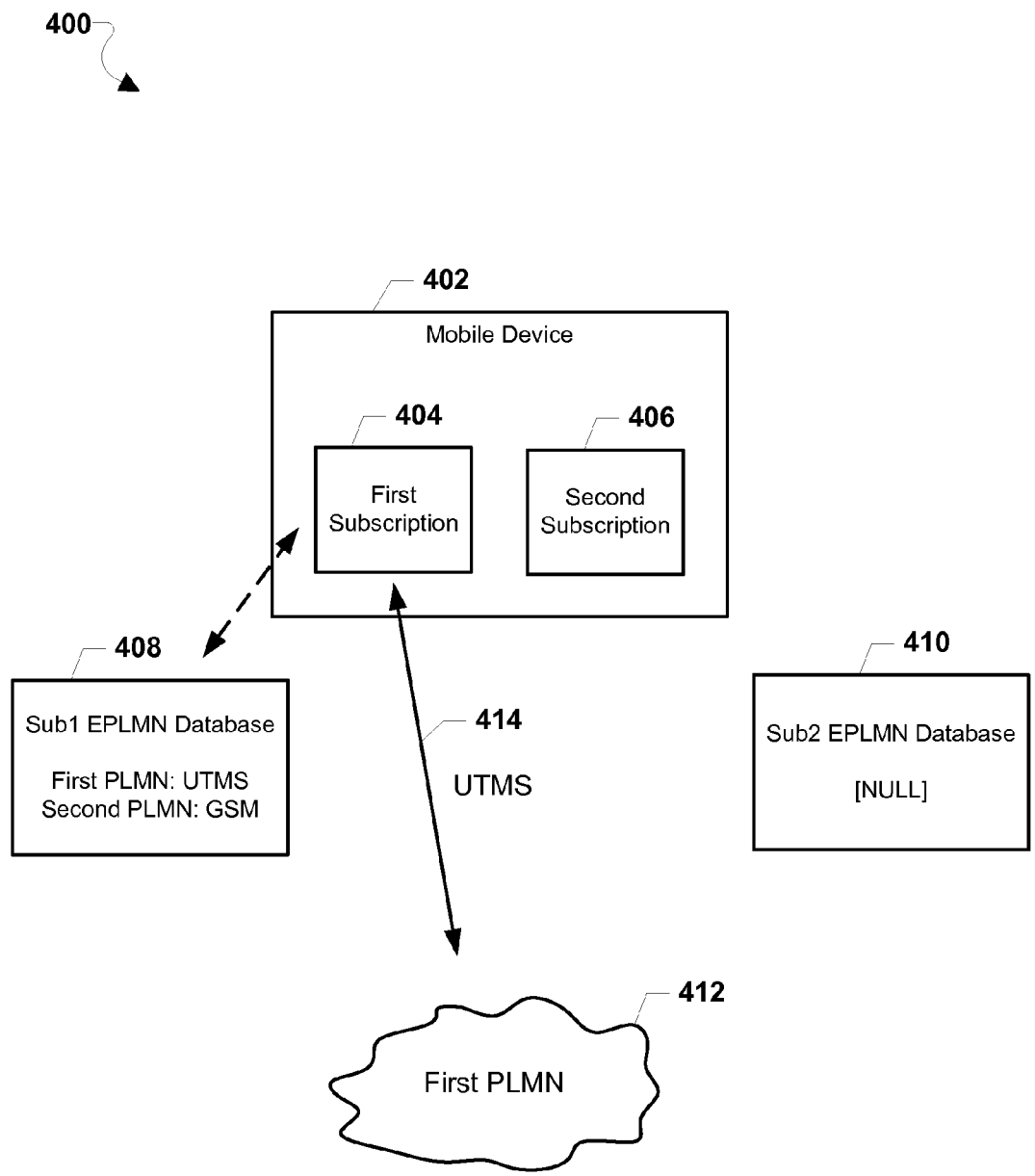
FIGS. 4A-4B are block diagrams illustrating PLMN registration with sharing of EPLMN databases in a mobile communication device according to various embodiments.
Figure 4B:
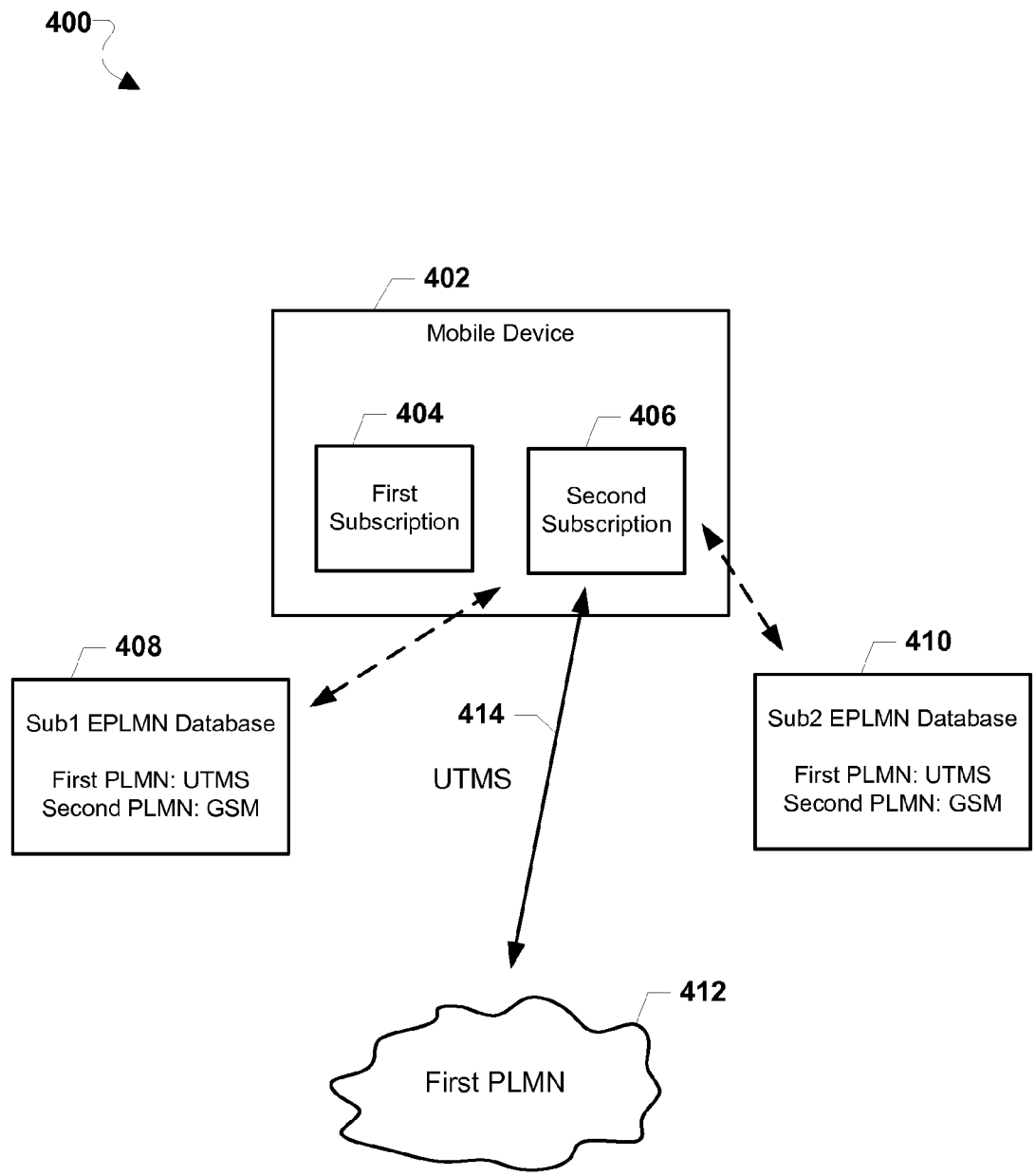

The block diagram 400 in FIGS. 4A-4B illustrates various embodiments for correcting asymmetric EPLMN configurations by sharing EPLMN data between subscriptions according to various embodiments. With reference to FIGS. 1, 2, 4A, and 4B, the block diagram 400 includes a mobile communication device 402, which may be similar to mobile communication devices 110, 120, and 200, with one or more SIMs that supports a first subscription 404 and a second subscription 406. The first subscription 404 and the second subscription 406 may belong to the same network operator. The first subscription may normally be registered on a first PLMN 412 through a first RAT, such as a UMTS RAT 414. The first subscription 404 may be associated with an EPLMN database 408. The EPLMN database 408 stores equivalent PLMNs to the first PLMN 412. For example, the EPLMN database 408 shows that the first PLMN 412 is equivalent to a second PLMN that operates through a second RAT, such as a GSM RAT. The EPLMN database 408 may be sent by the network operator to the mobile communication device 402 to be stored by the mobile communication device (e.g., in memory 214) and associated with the first subscription 404 such that the first subscription 404 may use the EPLMN database 408 to acquire service from PLMNs that are equivalent to the first PLMN 412.

The second subscription 406 may be associated with another EPLMN database 410. In the illustrated example, the EPLMN database 410 is empty, or null, in contrast to the EPLMN database 408, which is populated. This may be because the network operator did not send any (or otherwise sufficient) information regarding equivalent PLMNs to the second subscription 406. Because the first subscription 404 and the second subscription 406 belong to the same network operator, the EPLMN databases 408, 410 should be the same.

FIG. 4B shows an example of PLMN selection in the mobile communication device 402 in which the first subscription 404 and the second subscription 406 may share access to EPLMN databases 408, 410. With reference to FIGS. 1, 2, 4A, and 4B, a user may initiate a switch from the first subscription 404 to the second subscription 406. The second subscription 406 may normally register with the second PLMN through the GSM RAT. When the second subscription 406 becomes active, the second subscription 406 performs a PLMN selection procedure.

The mobile communication device 402 may optionally determine whether the second subscription 406 is capable of registering with the second PLMN through the UMTS RAT 414. This may be done in instances in which the first subscription 404 is communicating over a high data communication rate RAT (e.g., the UMTS RAT 414) and the second subscription is able to maintain continuity and communicate over the same RAT. If the mobile communication device 402 determines that the second subscription 406 is capable of registering with the second PLMN through the UMTS RAT 414, the second subscription 406 may register with the second PLMN through the UMTS RAT 414 (not illustrated in FIG. 4B).

During the PLMN selection procedure for the second subscription 406, a processor of the mobile communication device 402 (e.g. the general processor 206 or baseband modem processor 216) may check the EPLMN database 410 to determine all the equivalent PLMNs that are available. The mobile communication device 402 may also check the EPLMN database 408 associated with the first subscription 404. The mobile communication device 402 may determine whether the second subscription 406 received all EPLMN information from the network operator by comparing the EPLMN database 408 to the EPLMN database 410 to determine whether the EPLMN databases 408, 410 are the same. For example, the mobile communication device 402 may determine whether the EPLMN database 410 stores the same number of PLMNs as the EPLMN database 408, and also determine whether each PLMN stored in the EPLMN database 410 matches a PLMN stored in the EPLMN database 408. If the EPLMN database 410 does not contain all the entries in the EPLMN database 408, there is an asymmetric EPLMN configuration among subscriptions that belong to the same network operator.

If the mobile communication device 402 determines that the EPLMN databases 408, 410 are not the same (e.g., the second subscription 406 did not receive the EPLMN database 410 from the network operator), the mobile communication device 402 may append the EPLMN database 408 to the EPLMN database 410 or otherwise modify the EPLMN database 410 based on the EPLMN database 408. For example, the mobile communication device 402 may copy the EPLMN database 408 to the EPLMN database 410, or may add non-duplicative or non-overlapping entries from the EPLMN database 408 to the EPLMN database 410. FIG. 4B illustrates appending the EPLMN database 408 to the EPLMN database 410 such that both the EPLMN databases 408, 410 have the same entries. The mobile communication device 402 may also append non-duplicative entries from the EPLMN database 410 to the EPLMN database 408 if the EPLMN database 408 is also incomplete.

Returning to FIGS. 1, 2, 4A, and 4B, the mobile communication device 402 may cause the second subscription 406 to register with a PLMN selected from the equivalent PLMNs in the (modified) EPLMN database 410. Accordingly, the second subscription 406 may be capable of communicating through both UMTS and GSM RATs, and thus may register with both the first PLMN 412 and the second PLMN. In the illustrated example, the UMTS RAT 414 has a higher data communication rate than the GSM RAT, and so the second subscription 406 may register with the first PLMN 412 through the UMTS RAT 414 to maximize the data throughput of the second subscription 406. Thus, by allowing the first subscription 404 and the second subscription 406 to share and append the EPLMN databases 408, 410 with each other, the mobile communication device 402 may correct asymmetric EPLMN configurations.

Figure 5:
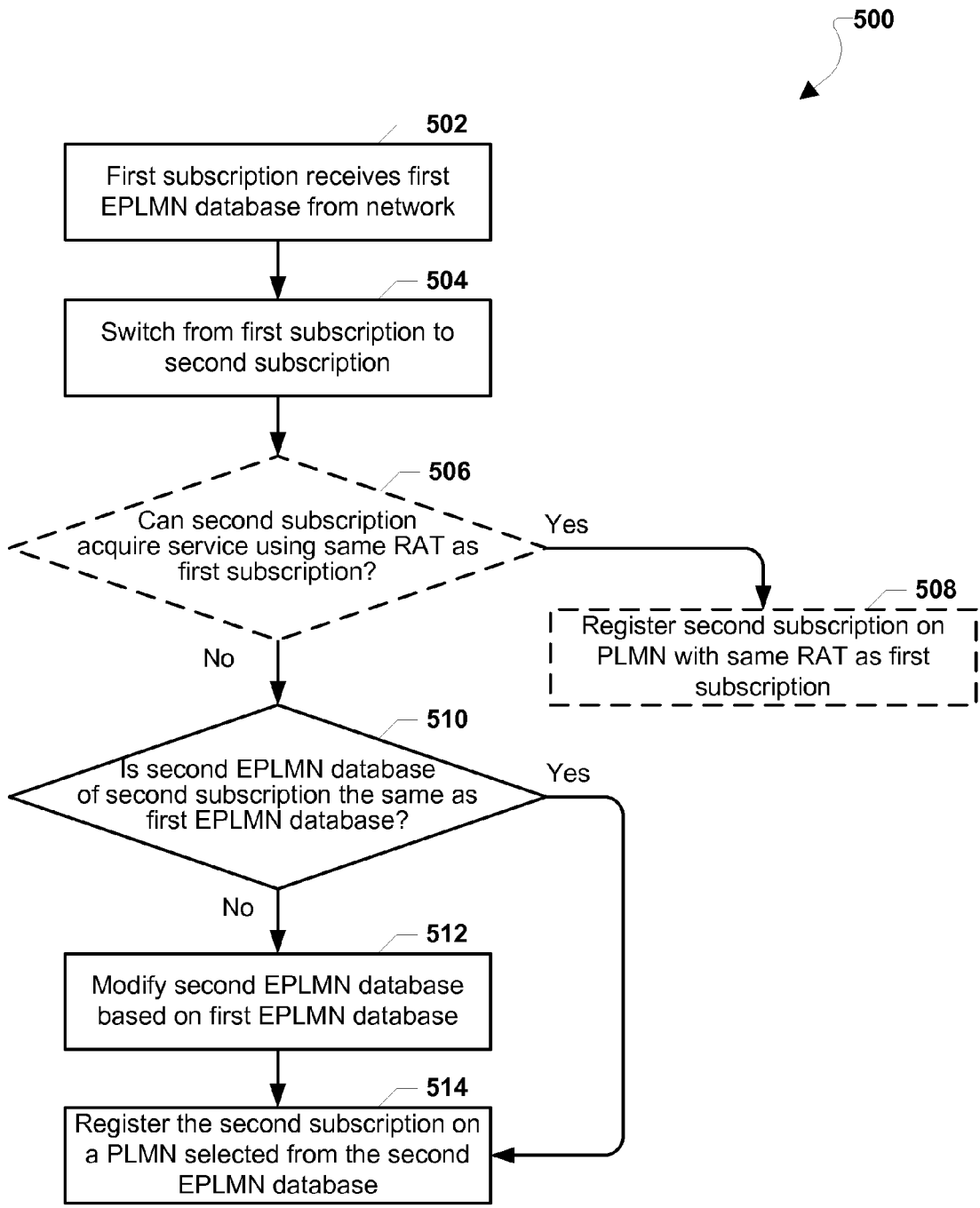
FIG. 5 is a process flow diagram illustrating a method for acquiring service on a mobile communication device according to various embodiments.

FIG. 5 illustrates a method 500 for acquiring service on a mobile communication device according to various embodiments. With reference to FIGS. 1, 2, and 4A-5, the method 500 may be implemented with a processor (e.g., the general processor 206, the baseband modem processor 216, a separate controller, and/or the like) of a mobile communication device (such as the mobile communication devices 110, 120, 200, 402) that supports two or more subscriptions that belong to the same network operator.

In block 502, the device processor may receive a first EPLMN database (e.g., 408) for a first subscription from the network operator. The first subscription may normally be registered with a first PLMN that is operated by the network operator, and the first subscription may communicate with the first PLMN through a first RAT (e.g., a UMTS RAT). The first EPLMN database may have entries listing one or more equivalent PLMNs to the first PLMN to which the first subscription is connected. The first EPLMN database may be stored in memory (e.g., the memory 214 of the multi-SIM mobile communication device 200) and associated with the first subscription. The second subscription of the mobile communication device may also store an associated second EPLMN database (e.g., 410).

In block 504, the device processor may initiate a switch from the first subscription, which is the active subscription, to the second subscription, which may be idle. For example, a user of the mobile communication device may enter an input to switch from the first subscription to the second subscription. The second subscription may normally be registered with a second PLMN operated by the network operator through a second RAT (e.g., a GSM RAT).

In optional determination block 506, the device processor may determine whether the second subscription may register with the second PLMN using the first RAT that the first subscription used to communicate with the first PLMN. For example, if the first subscription was registered with the first PLMN through a UMTS RAT, the device processor may determine whether the second subscription may register (e.g., is capable of registering) with the second PLMN through a UMTS RAT. The device processor may perform the operation of optional determination block 506 to check whether the mobile communication device can maintain continuity in the speed or quality of data service (e.g., whether the second subscription can maintain the same data communication rate as the first subscription).

In response to determining that the second subscription can register with the second PLMN using the same RAT that the first subscription used to register with the first PLMN (i.e., optional determination block 506="Yes"), the device processor may register the second subscription with the second PLMN using the first RAT (i.e., the same RAT that the first subscription used to register with the first PLMN) in optional block 508. For example, the second subscription may register with the second PLMN using a UMTS RAT if the first subscription also registered with the first PLMN using a UMTS RAT.

In response to determining that the second subscription may not register with the second PLMN using the same RAT that the first subscription used to register with the first PLMN (i.e., optional determination block 506="No"), the device processor may determine whether the second EPLMN database is the same as the first EPLMN database in determination block 510. The first subscription obtained the first EPLMN database from the network operator, and so the device processor may determine whether the second subscription also obtained the EPLMN database from the network operator by comparing the two databases. The EPLMN database for both the first and second subscriptions should be the same because both subscriptions belong to the same network operator. The device processor may compare the first EPLMN database associated with the first subscription and the second EPLMN database associated with the second subscription. This comparison may include determining whether the second EPLMN database stores the same number of PLMNs as the first EPLMN database, and also determining whether each PLMN stored in the second EPLMN database matches a PLMN stored in the first EPLMN database. If the second EPLMN database associated with the second subscription is empty or does not have the same entries as the first EPLMN database associated with the first subscription, this may be an indication of an asymmetric EPLMN configuration and that the second subscription does not have full information about the equivalent PLMNs available from the network operator.

In response to determining that the second EPLMN database is not the same as the first EPLMN database (i.e., determination block 510="No"), the device processor may modify the second EPLMN database based on the first EPLMN database, in block 512. For example (but not limited to), the device processor may append the first EPLMN database to the second database by adding non-duplicative or non-overlapping entries from the first EPLMN database associated with the first subscription to the second EPLMN database associated with the second subscription. Alternatively, if the second EPLMN database is empty, the device processor may copy the first EPLMN database associated with the first subscription to the second EPLMN database associated with the second subscription. The device processor may also modify the first EPLMN database based on the second EPLMN database if the second EPLMN database contains PLMN entries that are not found in the first EPLMN database. For example, both EPLMN databases may contain entries not found in the other database and so the device processor may make both EPLMN databases consistent.

In response to determining that the second EPLMN database is the same as the first EPLMN database (i.e., determination block 510="Yes"), or after modifying the second EPLMN database associated with the second subscription based on the first EPLMN database associated with the first subscription (in block 512), the device processor may register the second subscription with a PLMN selected from the modified second EPLMN database associated with the second subscription in block 514. In other words, after either fixing the asymmetric EPLMN configuration in both subscriptions or determining that a symmetric EPLMN configuration already exists, the device processor may continue with the PLMN selection procedure. The device processor may select a PLMN from the second EPLMN database based on a preferred metric, for example, a PLMN that maximizes the data communication rate of the second subscription. For example, if the second EPLMN database has entries for a PLMN that communicates through a UMTS RAT and a PLMN that communicates with a GSM RAT, the device processor may select the PLMN that communicates through the UMTS RAT because the UMTS RAT has a higher data communication rate than the GSM RAT. Alternatively, the device processor may select a PLMN from the second EPLMN database that may communicate through the same RAT as the first subscription. In this manner, the method 500 provides a way to correct asymmetric EPLMN configurations in mobile communication devices with two or more subscriptions that belong to the same network operator.

Figure 6:
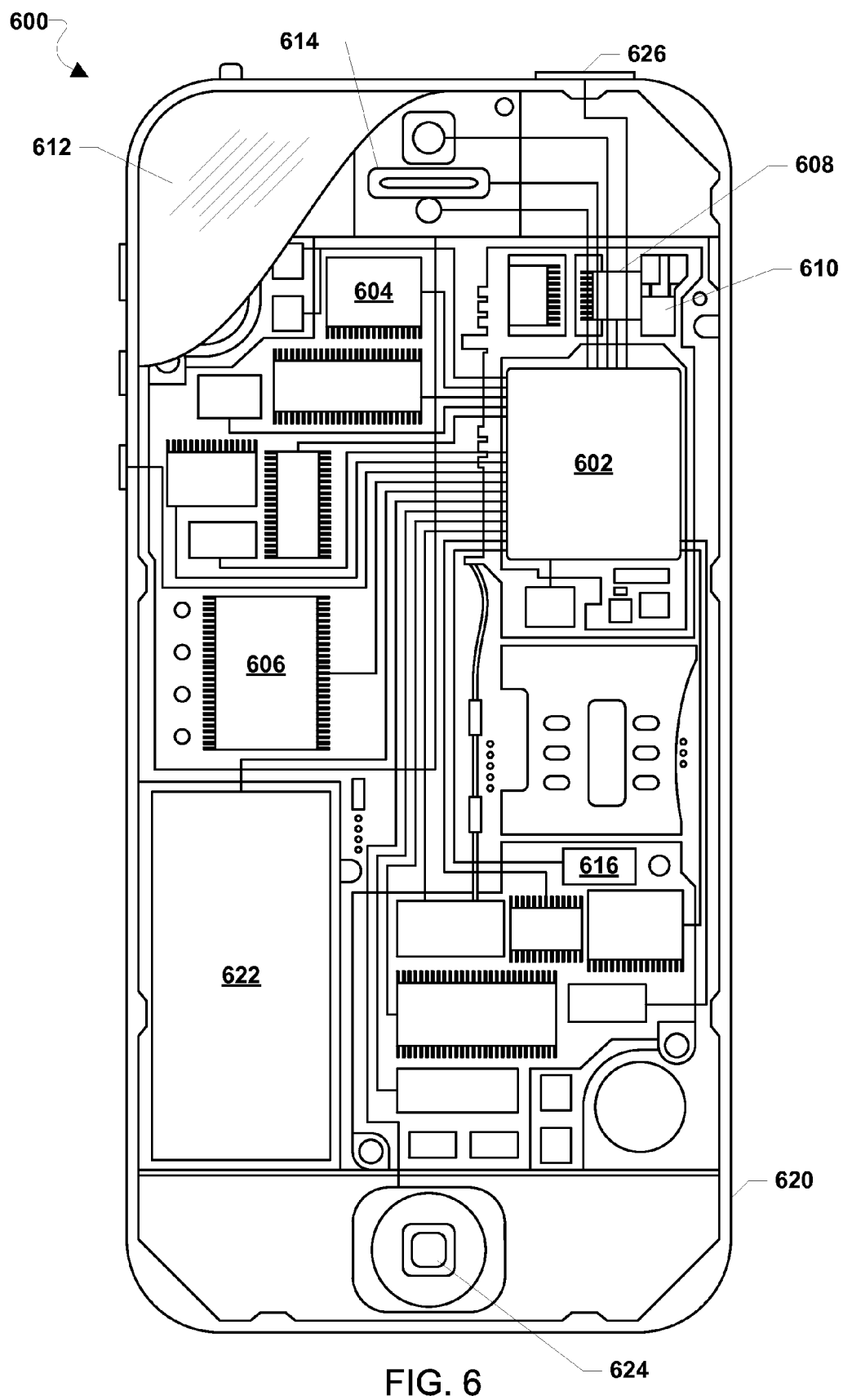
FIG. 6 is a component block diagram of a mobile communication device suitable for implementing some embodiment methods.

Various embodiments may be implemented in any of a variety of communication devices, an example of which (e.g., multi-SIM mobile communication device 600) is illustrated in FIG. 6. With reference to FIGS. 1, 2, and 4A-6, the multi-SIM mobile communication device 600 may be similar to the mobile communication devices 110, 120, 200, 402 as described. As such, the multi-SIM mobile communication device 600 may implement the method 500 according to various embodiments.

The multi-SIM mobile communication device 600 may include a processor 602 coupled to a touchscreen controller 604 and an internal memory 606. The processor 602 may be one or more multi-core integrated circuits designated for general or specific processing tasks. The internal memory 606 may be volatile or non-volatile memory, and may also be secure and/or encrypted memory, or unsecure and/or unencrypted memory, or any combination thereof. The touchscreen controller 604 and the processor 602 may also be coupled to a touchscreen panel 612, such as a resistive-sensing touchscreen, capacitive-sensing touchscreen, infrared sensing touchscreen, etc. Additionally, the display of the multi-SIM mobile communication device 600 need not have touch screen capability.

The multi-SIM mobile communication device 600 may have one or more cellular network transceivers 608 coupled to the processor 602 and to one or more antennas 610 and configured for sending and receiving cellular communications. The one or more transceivers 608 and the one or more antennas 610 may be used with the herein-mentioned circuitry to implement various embodiment methods. The multi-SIM mobile communication device 600 may include one or more SIM cards 616 coupled to the one or more transceivers 608 and/or the processor 602 and may be configured as described herein.

The multi-SIM mobile communication device 600 may also include speakers 614 for providing audio outputs. The multi-SIM mobile communication device 600 may also include a housing 620, constructed of a plastic, metal, or a combination of materials, for containing all or some of the components discussed herein. The multi-SIM mobile communication device 600 may include a power source 622 coupled to the processor 602, such as a disposable or rechargeable battery. The rechargeable battery may also be coupled to the peripheral device connection port to receive a charging current from a source external to the multi-SIM mobile communication device 600. The multi-SIM mobile communication device 600 may also include a physical button 624 for receiving user inputs. The multi-SIM mobile communication device 600 may also include a power button 626 for turning the multi-SIM mobile communication device 600 on and off.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configurations. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc in which disks usually reproduce data magnetically, while discs reproduce data optically with lasers. Combinations of the storage media are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to some embodiments without departing from the spirit or scope of the written description. Thus, the present disclosure is not intended to be limited to the embodiments shown herein but is to be accorded the widest scope consistent with the following claims and the principles and novel features disclosed herein.

What is claimed is:

1. A method of acquiring service on a mobile communication device having a first subscription and a second subscription belonging to the same network operator, the method comprising:

receiving a first equivalent public land mobile network (EPLMN) database associated with the first subscription;

determining whether a second EPLMN database associated with the second subscription is the same as the first EPLMN database; and modifying the second EPLMN database based on the first EPLMN database in response to determining that the second EPLMN database associated with the second subscription is not the same as the first EPLMN database.

2. The method of claim 1, further comprising registering the second subscription with a public land mobile network (PLMN) selected from the second EPLMN database.

3. The method of claim 2, wherein registering the second subscription with a PLMN selected from the second EPLMN database is performed in response to determining that the second EPLMN database associated with the second subscription is the same as the first EPLMN database.

4. The method of claim 2, wherein registering the second subscription with a PLMN selected from the second EPLMN database comprises selecting a PLMN, from the second EPLMN database, associated with a radio access technology (RAT) with a higher data communication rate than radio access technologies associated with other PLMNs in the second EPLMN database.

5. The method of claim 1, further comprising receiving the second EPLMN database associated with the second subscription.

6. The method of claim 1, wherein modifying the second EPLMN database based on the first EPLMN database comprises appending non-duplicative entries from the first EPLMN database to the second EPLMN database.

7. The method of claim 1, wherein:
the second EPLMN database is empty; and
modifying the second EPLMN database based on the first EPLMN database comprises copying the first EPLMN database to the second EPLMN database.

8. The method of claim 1, wherein in a case in which the first subscription is registered on a first PLMN through a first RAT and the second subscription is registered on a second PLMN, the method further comprising:
determining whether the second subscription is capable of registering with the second PLMN through the first RAT; and
registering the second subscription with the second PLMN through the first RAT in response to determining that the second subscription is capable of registering with the second PLMN through the first RAT.

9. The method of claim 1, further comprising modifying the first EPLMN database based on the second EPLMN database in response to determining that the second EPLMN database associated with the second subscription is not the same as the first EPLMN database.

10. The method of claim 1, wherein determining whether a second EPLMN database associated with the second subscription is the same as the first EPLMN database comprises:
determining whether the second EPLMN database stores the same number of PLMNs as the first EPLMN database; and
determining whether each PLMN stored in the second EPLMN database matches a PLMN stored in the first EPLMN database.

11. A mobile communication device, comprising:
a memory;
a radio frequency (RF) resource; and
a processor coupled to the memory and the RF resource, configured to connect to a first subscriber identity module (SIM) associated with a first subscription and to a second SIM associated with a second subscription that belongs to a same network operator as the first subscription, and the processor further configured with processor-executable instructions to:
    receive a first equivalent public land mobile network (EPLMN) database associated with the first subscription;
    determine whether a second EPLMN database associated with the second subscription is the same as the first EPLMN database; and
    modify the second EPLMN database based on the first EPLMN database in response to determining that the second EPLMN database associated with the second subscription is not the same as the first EPLMN database.

12. The mobile communication device of claim 11, wherein the processor is further configured with processor-executable instructions to register the second subscription with a public land mobile network (PLMN) selected from the second EPLMN database.

13. The mobile communication device of claim 12, wherein the processor is further configured with processor-executable instructions to register the second subscription with a PLMN selected from the second EPLMN database in response to determining that the second EPLMN database associated with the second subscription is the same as the first EPLMN database.

14. The mobile communication device of claim 12, wherein the processor is further configured with processor-executable instructions to register the second subscription with a PLMN selected from the second EPLMN database by selecting a PLMN, from the second EPLMN database, associated with a radio access technology (RAT) with a higher data communication rate than radio access technologies associated with other PLMNs in the second EPLMN database.

15. The mobile communication device of claim 11, wherein the processor is further configured with processor-executable instructions to receive the second EPLMN database associated with the second subscription.

16. The mobile communication device of claim 11, wherein the processor is further configured with processor-executable instructions to modify the second EPLMN database based on the first EPLMN database by appending non-duplicative entries from the first EPLMN database to the second EPLMN database.

17. The mobile communication device of claim 11, wherein the second EPLMN database is empty and the processor is further configured with processor-executable instructions to modify the second EPLMN database based on the first EPLMN database by copying the first EPLMN database to the second EPLMN database.

18. The mobile communication device of claim 11, wherein in a case in which the first subscription is registered on a first PLMN through a first RAT and the second subscription is registered on a second PLMN, and wherein the processor is further configured with processor-executable instructions to:
    determine whether the second subscription is capable of registering with the second PLMN through the first RAT; and
    register the second subscription with the second PLMN through the first RAT in response to determining that the second subscription is capable of registering with the second PLMN through the first RAT.

19. The mobile communication device of claim 11, wherein the processor is further configured with processor-executable instructions to modify the first EPLMN database based on the second EPLMN database in response to determining that the second EPLMN database associated with the second subscription is not the same as the first EPLMN database.

20. The mobile communication device of claim 11, wherein the processor is further configured with processor-executable instructions to determine whether a second EPLMN database associated with the second subscription is the same as the first EPLMN database by:
    determining whether the second EPLMN database stores the same number of PLMNs as the first EPLMN database; and
    determining whether each PLMN stored in the second EPLMN database matches a PLMN stored in the first EPLMN database.

21. A non-transitory computer readable storage medium having stored thereon processor-executable software instructions configured to cause a processor of a mobile communication device to perform operations comprising:
    receiving a first equivalent public land mobile network (EPLMN) database associated with a first subscription on the mobile communication device;
    determining whether a second EPLMN database associated with a second subscription on the mobile communication device is the same as the first EPLMN database, wherein the first subscription and the second subscription belong to the same network operator; and
    modifying the second EPLMN database based on the first EPLMN database in response to determining that the second EPLMN database associated with the second subscription is not the same as the first EPLMN database.

22. The non-transitory computer readable storage medium of claim 21, wherein the stored processor-executable software instructions are configured to cause the processor to perform operations further comprising registering the second subscription with a public land mobile network (PLMN) selected from the second EPLMN database.

23. The non-transitory computer readable storage medium of claim 22, wherein the stored processor-executable software instructions are configured to cause the processor to perform operations such that registering the second subscription with a PLMN selected from the second EPLMN database is performed in response to determining that the second EPLMN database associated with the second subscription is the same as the first EPLMN database.

24. The non-transitory computer readable storage medium of claim 22, wherein the stored processor-executable software instructions are configured to cause the processor to perform operations such that registering the second subscription with a PLMN selected from the second EPLMN database comprises selecting a PLMN, from the second EPLMN database, associated with a radio access technology (RAT) with a higher data communication rate than radio access technologies associated with other PLMNs in the second EPLMN database.

25. The non-transitory computer readable storage medium of claim 21, wherein the stored processor-executable software instructions are configured to cause the processor to perform operations comprising receiving the second EPLMN database associated with the second subscription.

26. The non-transitory computer readable storage medium of claim 21, wherein the stored processor-executable software instructions are configured to cause the processor to perform operations such that modifying the second EPLMN database based on the first EPLMN database comprises appending non-duplicative entries from the first EPLMN database to the second EPLMN database.

27. The non-transitory computer readable storage medium of claim 21, wherein the second EPLMN database is empty and the stored processor-executable software instructions are configured to cause the processor to perform operations such that modifying the second EPLMN database based on the first EPLMN database comprises copying the first EPLMN database to the second EPLMN database.

28. The non-transitory computer readable storage medium of claim 21, wherein in a case in which the first subscription is registered on a first PLMN through a first RAT and the second subscription is registered on a second PLMN, and wherein the stored processor-executable software instructions are configured to cause the processor to perform operations further comprising:
  determining whether the second subscription is capable of registering with the second PLMN through the first RAT; and
  registering the second subscription with the second PLMN through the first RAT in response to determining that the second subscription is capable of registering with the second PLMN through the first RAT.

29. The non-transitory computer readable storage medium of claim 21, wherein the stored processor-executable software instructions are further configured to cause the processor to perform operations comprising modifying the first EPLMN database based on the second EPLMN database in response to determining that the second EPLMN database associated with the second subscription is not the same as the first EPLMN database.

30. A mobile communication device, comprising:
  means for receiving a first equivalent public land mobile network (EPLMN) database associated with a first subscription on the mobile communication device;
  means for determining whether a second EPLMN database associated with a second subscription on the mobile communication device is the same as the first EPLMN database, wherein the first subscription and the second subscription belong to the same network operator; and
  means for modifying the second EPLMN database based on the first EPLMN database in response to determining that the second EPLMN database associated with the second subscription is not the same as the first EPLMN database.

* * * * *